United States Patent
Zheng

(10) Patent No.: US 7,068,614 B2
(45) Date of Patent: Jun. 27, 2006

(54) METHOD FOR MULTIPLE TIME SLOT POWER CONTROL

(75) Inventor: Zhibin Zheng, Shenzhen (CN)

(73) Assignee: Huawei Technologies Co., Ltd., Guangdong (CN)

( * ) Notice: Subject to any disclaimer, the term of this patent is extended or adjusted under 35 U.S.C. 154(b) by 449 days.

(21) Appl. No.: 10/395,000

(22) Filed: Mar. 24, 2003

(65) Prior Publication Data

US 2004/0047329 A1   Mar. 11, 2004

Related U.S. Application Data

(63) Continuation of application No. PCT/CN01/01183, filed on Jul. 19, 2001.

(30) Foreign Application Priority Data

Sep. 25, 2000   (CN)   ................................ 00 1 24608

(51) Int. Cl.
*H04Q 7/20*   (2006.01)
(52) U.S. Cl. ...................... 370/311; 370/318; 370/335; 370/342; 455/69; 455/522
(58) Field of Classification Search ..................... None
See application file for complete search history.

(56) References Cited

U.S. PATENT DOCUMENTS

| 6,885,875 B1 | 4/2005 | Benz et al. .................. 455/522 |
| 2001/0055968 A1 | 12/2001 | Yoshida et al. .............. 455/436 |
| 2002/0031105 A1 | 3/2002 | Zeira et al. .................. 370/337 |

FOREIGN PATENT DOCUMENTS

GB   2341294 A   3/2000

*Primary Examiner*—Dang Ton
*Assistant Examiner*—Robert C. Scheibel, Jr.
(74) *Attorney, Agent, or Firm*—Bacon & Thomas, PLLC

(57) ABSTRACT

The invention discloses a power control method for the multiple time-slot power control pattern in a CDMA system. The method pre-stores two encoded symbols which correspond to the all "1" and all "0" TPC commands respectively. Based on whether the current TPC command is identical with the last TPC command, the receiving end determines whether sending the original TPC command or the encoded TPC command. In the transmitting end, based on consistent degree of the received N TPC command data group and the encoded symbol, a corresponding power control mode is determined. The invention replaces the all "0" or all "1" TPC command with an encoded symbol, so the reliability of a TPC command is raised and the performance of power control is improved.

5 Claims, 1 Drawing Sheet

METHOD FOR MULTIPLE TIME SLOT POWER CONTROL

This application is a continuation of International application No. PCT/CN01/01183, filed Jul. 19, 2001, of which the entire disclosure of the pending, prior application is hereby incorporated by reference.

FIELD OF THE TECHNOLOGY

The invention relates generally to the power control technique of a CDMA mobile communication system, and more particularly to the power control method of a multiple time-slot power control pattern.

BACKGROUND OF THE INVENTION

Power control is an important technique for a CDMA mobile communication system. Purpose of the power control is to overcome near-far effect in the way that a system not only keeps higher communication quality, but also operates without interference to other subscribers sharing the same channel. In the 3G mobile communication system, the power control uses decision feedback mode, which works as follows. The receiving end B measures signal-to-interference ratio (SIR) of a received signal, then, the measured SIR value is compared with a SIR threshold-value to generate a Transmit Power Control (TPC) command. The TPC is sent to the transmitting end A, and A adjusts the transmitting power based on the received TPC command. Usually, the adjustment happens once for a time-slot.

In a wideband CDMA (WCDMA) system, a multiple time-slot TPC control method has been defined (reference to 3GPP TS25.211). In this method, the receiving end B also sends back a TPC command to the transmitting end A during every time-slot. However, during every N time-slot, from the $1^{st}$ to the $(N-1)^{th}$, the transmitting end A does not adjust the transmitting power with the TPC command, but at the $N^{th}$ time-slot, the transmitting end A adjusts the transmitting power based on the N TPC commands. In this case, the N time-slots are seen as a power control group. The specific procedure is as the following:

During the first N−1 time-slots, the receiving end B measures SIR values of the received signal, and compares with a SIR threshold-value to generate a TPC command, which is then sent back to the transmitting end A. During this N−1 period, the transmitting end A receives and stores the feedback TPC commands, but does not adjust the transmitting power.

At the $N^{th}$ time-slot, after having been received the $N^{th}$ TPC command, the transmitting end A executes the followings:

(1) If N time-slots TPC commands are all "1", then the transmitting power is increased;

(2) If N time-slots TPC commands are all "0", then the transmitting power is decreased;

(3) Otherwise, the transmitting power will not be adjusted.

Since the TPC command is obtained by hard decision, and there are no encoding and decoding during transmission, the TPC command has a higher error code. Consequentially, with this method, the power control result has a big inaccuracy.

SUMMARY OF THE INVENTION

The invention is a power control method used in multiple time-slots control pattern of a CDMA mobile communication system. The method at least comprises:

(a) Pre-store two encoded symbols corresponding to TPC command of all "1" and all "0", at receiving end and transmitting end, respectively;

(b) The receiving end generating a TPC command, and the TPC command being detected by whether the current TPC command is identical with the last one. If they are different, then the unencoded TPC command generated currently is sent. It they are identical, the corresponding position data of the encoded symbol, corresponding to the current TPC command value, is sent as the TPC command;

(c) At the $N^{th}$ time-slot, the transmitting end detecting whether the N TPC commands, having been received and being composed of a TPC command data group, are consistent with the said encoded symbols. If they are consistent, then the transmitting power is adjusted according to the encoded symbols, otherwise the transmitting power is not adjusted. Wherein, the N is time-slots number of the power control group, and is an integer that is greater than or equal to 2.

Said encoded symbols are obtained by the (N×k, k) encoding, wherein k is the bits number of every time-slot TPC command, and k is an integer that is greater than or equal to 1. Every time-slot TPC command being an all "1" k bits binary number or an all "0" k bits binary number correspond said two encoded symbols correspond to all "1" TPC command and all "0" TPC command, respectively.

In the step c) above, when the information, consisted of received N TPC commands data group, is not consistent with the encoded symbol, it can be further detected whether the number of identical/different bits between the received N TPC commands data group and the encoded symbols are greater/less than a threshold-value. If greater, then the transmitting power is adjusted, otherwise it is kept unadjusted.

Through replacing all "0" or all "1" TPC command with an encoded symbol, reliability of the TPC command in the multiple time-slots TPC control pattern is raised, particularly, for all "0" TPC command and all "1" TPC command. So the power control performance can be improved.

The invention only needs adding several small registers in receiving and transmitting end, respectively, and the encoded symbols are pre-stored in these small registers, without increasing implementation complexity.

In addition, the invention uses pre-encoded symbols, and in both receiving and transmitting ends, known encoded symbols are pre-stored. When transmitting TPC command, only corresponding position bits information of the encoded symbol is transmitted. When receiving TPC command, only the data group consisted of the received TPC commands is compared with the encoded symbols. There is no encoding and decoding, so there is no encoding and decoding procedures needed in implementation.

EMBODIMENTS OF THE INVENTION

Figure 1:
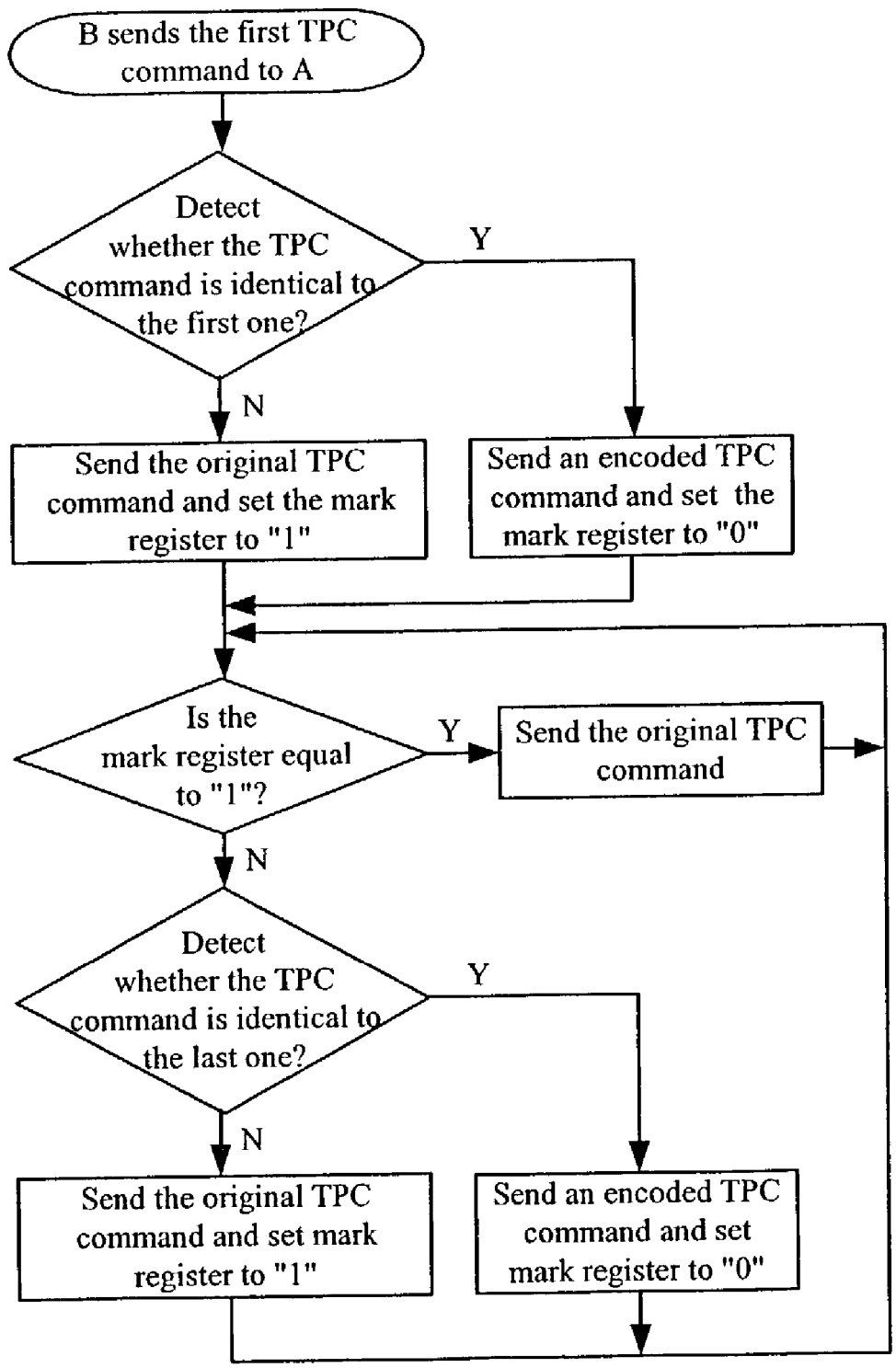
FIG. 1 shows a flowchart of TPC command transmitted in the receiving end.

The invention will be described in more detail, hereinafter, with reference to the drawing.

The invention replaces the all "1" or all "0" TPC command with an encoded symbol. In the transmitting end A and the receiving end B, two encoded symbols are pre-stored, respectively. The encoded symbols can be generated as follow: suppose length of every time-slot TPC command is k bits, then (N×k, k) encoding is made; the encoding information elements are only two kinds: k "1" bits or k "0" bits; encoded symbol 1 with N×k length corresponds to the all "1" TPC command, and encoded symbol 2 corresponds to the all "0" TPC command. In addition, there is a mark register set in the receiving end.

TPC command transmitting flow, at the receiving end B, is shown in FIG. 1.

(1) When the receiving end B generates the first TPC command, an unencoded TPC command generated currently is sent to the transmitting end A.

(2) Starting from the second time-slot, the receiving end executes the following procedures:

a. the receiving end detects whether the second TPC command is identical with the first TPC command; if they are different, the unencoded TPC command generated currently is sent and the mark register is set to 1; if they are identical, then the mark register is set to 0; at this moment, if the TPC command is "1", then the information in the corresponding position of the encoded symbol 1 is sent as a TPC command, if the TPC command is "0" then the information in the corresponding position of the encoded symbol 2 is sent as a TPC command;

b. for the next TPC command, checks the mark register firstly, if it is 1, then the unencoded TPC command generated currently is sent; if it is 0, then the current TPC command is compared with the last TPC command to see whether they are identical; if they are different, then the unencoded TPC command generated currently is sent and the mark register is set to 1; if they are identical, then based on the current TPC command, the TPC command to be sent is decided as follow: if the current TPC command is "1", then the corresponding position information of the encoded symbol 1 is sent as a TPC command; if the current TPC command is "0", then the corresponding position information of the encoded symbol 2 is sent as a TPC command;

c. for the successive time-slots, same procedure as step b is executed.

In the transmitting end, based on the received N×k bits of the TPC commands information, the power adjustment mode is determined by the followings:

a. if the received N×k bits of the TPC commands are consistent with the encoded symbol 1, then the transmitting power is increased; otherwise, the Hamming distance between the TPC commands and the encoded symbol 1 is determined, if the Hamming distance is less than a threshold-value, then the command is considered as an all "1" command and the transmitting power is increased, otherwise goes to the next step;

b. comparing the received N×k bits of the TPC commands with the encoded symbol 2, if they are consistent, then the transmitting power is decreased; otherwise, the Hamming distance between the TPC commands and the encoded symbol 2 is determined, if the Hamming distance is less than a threshold-value, then the command is considered as an all "0" command and the transmitting power is decreased;

c. if the above conditions are all unsatisfied, then the transmitting power is unchanged.

Take an example in the followings. Suppose every time-slot of TPC command has a length of 2 bits (in TPC command, these two bits are either "11" or "00"), the transmitting power is possibly adjusted once for every 5 time-slots, the pre-stored encoded symbol 1 is "11 10 01 01 01" and the pre-stored encoded symbol 2 is "00 01 10 10 10", and the threshold-value of the Hamming distance is 2.

(1) If the TPC command generated during successive 5 time-slots by the receiving end B is "11 11 11 11 11", then the corresponding procedure is as follow:

a. for the first time-slot, the receiving end B sends a TPC command "11" to the transmitting end;

b. for the second time-slot, the current TPC command is identical to the last command, so the mark register is set to 0 and the corresponding position information "10" in the encoded symbol 1 is sent as a real TPC command;

c. the steps for all successive time-slots are similar to step b: at the third time-slot, a "01" is sent as a TPC command; at the fourth time-slot, a "01" is sent as a TPC command; and at the fifth time-slot, a "01" is sent as a TPC command;

d. the TPC command received during successive 5 time-slots by the transmitting end A is "11 10 01 01 01" which is identical to encoded symbol 1, so the transmitting power is increased.

(2) If the TPC command generated during successive 5 time-slots by the receiving end B is "00 00 00 00 00", then the corresponding procedure is as follow:

a. for the first time-slot, the receiving end B sends a TPC command "00" to the transmitting end;

b. for the second time-slot, the current TPC command is identical to the last command, so the mark register is set to 0 and the corresponding position information "01" in the encoded symbol 2 is sent as a real TPC command;

c. the steps for all successive time-slots are similar to step b: at the third time-slot, a "10" is sent as a TPC command; at the fourth time-slot, a "10" is sent as a TPC command; and at the fifth time-slot, a "10" is sent as a TPC command;

d. the TPC command received during successive 5 time-slots by the transmitting end A is "00 01 10 10 10" which is identical to the encoded symbol 2, so the transmitting power is decreased.

(3) If the TPC command generated during successive 5 time-slots by the receiving end B is "11 11 00 00 11", then the corresponding procedure is as follow:

a. for the first time-slot, the receiving end B sends a TPC command "11" to the transmitting end;

b. for the second time-slot, the current TPC command is identical to the last command, so the mark register is set to 0 and the corresponding position information "10" in the encoded symbol 1 is sent as a real TPC command;

c. for the third time-slot, the current TPC command is different with the last generated TPC command, so the mark register is sent to 1 and the unencoded current generated TPC command "00" is sent; for the fourth and fifth time-slots, the unencoded TPC commands generated currently "00" and "11" are sent, respectively;

d. the TPC command received during 5 time-slots by the transmitting end A is "11 10 00 00 11"; and firstly, the received TPC command "11 10 00 00 11" is compared with the encoded symbol 1 and it is shown that they are inconsistent and the Hamming distance is 3 that is greater than the threshold-value; next, the received TPC command "11 10 00 00 11" is compared with the encoded symbol 2 and it is shown that they are inconsistent and the Hamming distance is 7 that is greater than the threshold-value too; therefore, the transmitting end A will not adjust the transmitting power.

The invention replaces the all "0" or all "1" TPC command with an encoded symbol. In this way, the reliability of TPC command transmission is raised, and the power control performance is improved. Since the power control is more effective, the capacity and communication quality of CDMA system is raised.

It can be understood that the invention is not limited to the disclosed embodiment, but, on the contrary, is intended to cover various modifications and equivalent arrangement included within the spirit and scope of the appended claims.

The invention claimed is:

1. A power control method for the multiple time-slots power control pattern in a CDMA (Code Division Multiple Access) mobile communication system, comprising:
   a) at a receiving end and a transmitting end, pre-storing two encoded symbols which correspond to N TPC (Transmit Power Control) commands each having k bits with all "1" and N TPC commands each having k bits with all "0", respectively, wherein k is the number of bits of every time-slot TPC command and is an integer that is greater than or equal to 1, N is the number of time-slots of one power control group and is an integer that is greater than or equal to 2;
   b) at the receiving end, generating a TPC command at each of N time-slots, determining whether the TPC command generated at the current time-slot is identical with the TPC command generated at the last time-slot; if not, sending an unencoded TPC command generated currently; if yes, sending an encoded TPC command corresponding to the time-slot position data of the encoded symbol which corresponds to the current generated TPC command value;
   c) at the $N^{th}$ time-slot, determining whether information consisted of the N TPC commands received in the transmitting end are consistent with said encoded symbols; if yes, adjusting transmitting power based on the encoded symbols, otherwise keeping the transmitting power unadjusted.

2. The power control method of claim 1, wherein step c) further comprises the steps of:
   if the information consisted of the received N TPC commands is not consistent with the encoded symbols, further determining whether the number of identical bits between the received N TPC commands and the encoded symbols is greater than a threshold-value, or determining whether the number of different bits between the information and the encoded symbols is less than a threshold-value; if so, then adjusting the transmitting power based on the encoded symbols, otherwise keeping the transmitting power unadjusted.

3. The power control method of claim 1, wherein the encoded symbols in the step a) is obtained by a (N×k, k) encoding; every time-slot TPC command having k bits with all "1" or all "0" corresponds with encoded symbol of all "1" TPC command or encoded symbol of all "0" TPC command respectively.

4. The power control method of claim 1, wherein step b) further comprises the steps of:
   b1) setting a mark register in the receiving end;
   b2) at a first of N time-slots, generating a first TPC command in the receiving end, and sending an unencoded TPC command generated in the first time-slot to the transmitting end;
   b3) in the receiving end at a second of N time-slots, generating a second TPC command, determining whether the second generated TPC command is identical with the first generated TPC command; if no, sending an unencoded TPC command generated in the second time-slot and setting 1 to the mark register; if yes, setting 0 to the mark register and sending an encoded TPC command that corresponds to a second time-slot position data of the encoded symbol which corresponds to the second generated TPC command value;
   b4) in the receiving end at the next of N time-slots, generating the current TPC command, checking whether the mark register is 1, if it so, sending the unencoded TPC command generated currently; otherwise determining whether the current generated TPC command and the TPC command generated in the last time slot are identical; if no, sending the unencoded TPC command generated currently and setting 1 to the mark register; otherwise, sending an encoded TPC command that corresponds to the current time-slot position data of the encoded symbol which corresponds to the TPC command value generated currently;
   b5) in the receiving end, executing the step b4) for all successive time-slots until the $N^{th}$ time-slot.

5. The power control method of claim 1, wherein step c) further comprises the steps of:
   c1) in the transmitting end, at the $N^{th}$ time-slot, determining whether the received N×k bits of the N TPC commands are consistent with the encoded symbol which corresponds to the all "1" TPC command; if yes, increasing the transmitting power; otherwise, further determining whether the Hamming distance between the received N×k bits and the encoded symbol which corresponds to the all "1" TPC command is less than a threshold-value; if yes, increasing the transmitting power; otherwise, going to step c2);
   c2) detecting whether the received N×k bits of the N TPC commands are consistent with the encoded symbol which corresponds to the all "0" TPC command; if yes, decreasing the transmitting power; otherwise, further determining whether the Hamming distance between the received N×k bits and the encoded symbol which corresponds to the all "0" TPC command is less than a threshold-value; if yes, decreasing the transmitting power; otherwise, keeping the transmitting power unadjusted.

* * * * *